United States Patent
Hu et al.

(10) Patent No.: US 8,249,316 B2
(45) Date of Patent: Aug. 21, 2012

(54) COMPONENT LABELING

(75) Inventors: Qingmao Hu, Royal Court (SG); Wieslaw Lucjan Nowinski, NUS Kent Vale (SG); Guoyu Qian, Singapore (SG)

(73) Assignee: Agency For Science, Technology and Research, Centros (SG)

( * ) Notice: Subject to any disclaimer, the term of this patent is extended or adjusted under 35 U.S.C. 154(b) by 1078 days.

(21) Appl. No.: 11/815,614

(22) PCT Filed: Feb. 7, 2006

(86) PCT No.: PCT/SG2006/000022
§ 371 (c)(1),
(2), (4) Date: Apr. 23, 2008

(87) PCT Pub. No.: WO2006/083236
PCT Pub. Date: Aug. 10, 2006

(65) Prior Publication Data
US 2008/0273772 A1    Nov. 6, 2008

(30) Foreign Application Priority Data
Feb. 7, 2005    (SG) .................................. 200500682

(51) Int. Cl.
*G06K 9/00*    (2006.01)
*G06K 9/20*    (2006.01)

(52) U.S. Cl. ........ 382/128; 382/171; 382/130; 382/195; 600/407

(58) Field of Classification Search .................. 382/180, 382/128–133; 600/407–464
See application file for complete search history.

(56) References Cited

U.S. PATENT DOCUMENTS

| | | | | |
|---|---|---|---|---|
| 4,791,676 A | * | 12/1988 | Flickner et al. | 382/204 |
| 5,199,083 A | * | 3/1993 | Takeda | 382/180 |
| 5,239,596 A | * | 8/1993 | Mahoney | 382/180 |
| 2005/0078859 A1 | * | 4/2005 | Cathier | 382/128 |

FOREIGN PATENT DOCUMENTS

| | | |
|---|---|---|
| EP | 0373854 A2 | 6/1990 |
| WO | 03045223 A2 | 6/2003 |

OTHER PUBLICATIONS

Qingmao Hu et al.; "Fast connected-component labelling in three-dimensional binary images based on iterative recursion", Computer Vision and Image Understanding 99, Sep. 2005, pp. 414-434.

(Continued)

*Primary Examiner* — Melissa Koval
*Assistant Examiner* — Emily Chan
(74) *Attorney, Agent, or Firm* — Fitch, Even, Tabin & Flannery, LLP

(57) ABSTRACT

Disclosed herein are methods, computer systems and computer program products for labeling components. One method includes the step of labeling (130) with a current label all voxels that are internal to a predetermined sub-volume oriented with respect to an unlabeled voxel, and directly connected to the unmarked voxel. The labeling step is repeated for all voxels that are not internal to the predetermined sub-volume, but which are labeled with a current label. The method includes the step of incrementing the current label and may include the step of increasing a window size to a predetermined maximum. The preceding steps are repeated for remaining unlabeled object voxels.

19 Claims, 4 Drawing Sheets

OTHER PUBLICATIONS

Kesheng Wu et al.; "Optimizing connected component labeling algorithms", Proceedings of SPIE Medical Imaging Conference 2005, 13 pgs.

Zu Y. Shan et al.; "Automated histogram-based brain segmentation in T1-weighted three-dimensional magnetic resonance head images", NeuroImage 17, 2002, pp. 1587-1598.

Kenji Suzuki, et al.; "Linear-time connected-component labeling based on sequential local operations", Computer Vision and Image Understanding 89, 2003, pp. 1-23.

Fu Chang, et al.; "A linear-time component-labeling algorithm using contour tracing technique", Computer Vision and Image Understanding 93, 2004, pp. 206-220.

Jesus Pujol, MD, et al.; "Clinical application of functional magnetic resonance imaging in presurgical identification of the central sulcus", J. Neurosurg 88, 1998, pp. 863-869.

Hiroaki Shimizu, et al.; "Localizing the central sulcus by functional magnetic resonance imaging and magnetoencephalography", Clinical Neurology and Neurosurgery 99, 1997, pp. 235-238.

Xiaodong Tao, et al.; "Statistical study on cortical sulci of human brains", Proceedings of Information Processing in Medical Imaging, 2001; pp. 475-487.

International Search Report, International Patent Application No. PCT/SG2006/000022, date of the actual completion of the search May 15, 2006, 3 pages.

Written Opinion, International Patent Application No. PCT/SG2006/000022, date of completion of opinion May 15, 2006, 3 pages.

* cited by examiner

|   | 1 | 1 | 1 |   | 1 |
|---|---|---|---|---|---|
| 1 | 1** |   | 1** | 1** | 1 |
| 1 |   | 1# |   | 1** | 1 |
| 1 |   | 1* | 1# | 1** | 1 |
| 1 |   |   | 1# |   | 1 |
|   | 1 |   | 1** |   | 1 |
| 1 |   |   |   |   | 1 |

FIG. 2

COMPONENT LABELING

FIELD OF THE INVENTION

The present invention relates to image processing, and relates more particularly to computer imaging techniques that are used for labeling spatially related components. Techniques of this type can be used in various computer vision and medical image processing applications, such as quantifying and segmenting radiological images of the human brain.

BACKGROUND

The term "component" is used in the field of computer vision to indicate a group of pixels or voxels having one or more common properties. This common property is, for many applications, spatial connectivity. Labeling connected components in a binary image is a fundamental operation in the fields of pattern recognition, computer vision, and medical image analysis. A binary image is converted into a symbolic image, and each connected component is assigned a unique label. There are basically two types of existing methods for labeling connected components: one type is based on label equivalences, and the other is based on contour tracing.

Several algorithms based on label equivalence are proposed for labeling connected components. These include algorithms that repeat passes through an image to propagate label equivalences directly, or indirectly via a provisional label search. A detailed review of these and other related types of algorithms can be found in Suzuki et al [Suzuki, K., Horiba, I., Sugie, N., "Linear-time connected component labeling based on sequential local operations", *Computer Vision and Image Understanding*, 2003; 89: 1-23].

Contour tracing techniques are described in Chang et al [Chang, F., Chen, C. J., Lu, C. J., "A linear-time component-labeling algorithm using contour tracing technique", *Computer Vision and Image Understanding*, 2004; 93: 206-220]. The two-dimensional (2D) contours are labeled, and only one pass is needed to label inner object pixels.

Both types of techniques have limitations. The number of passes required in label equivalence methods typically depends upon the complexity of the connected components. Similarly, the contour tracing methods are also dependent upon the complexity of the contours involved.

Labeling connected components is fundamentally a recursive operation. Starting from an object pixel or voxel of a component, any neighboring object pixels or voxels belonging to the same component is assigned the same label. Once a neighboring object pixel/voxel is labeled, its neighboring object pixels/voxels are checked and labeled. This procedure continues until all the object pixels/voxels of this component are labeled. Iterative computations are performed, in practice, to label the connected-components. Iterative functions are preferred as they do not consume as much stacked memory.

Nevertheless, iterative approaches to labeling connected components are computationally inefficient. This inefficiency is exacerbated when the images become larger, such as for three-dimensional magnetic resonance imaging (MRI) applications. Improved methods for labeling connected components are thus required in view of these and other observations.

SUMMARY

Connected component labeling, as described herein, is based on a technique referred to hereafter as enhanced recursion, which attempts to combine the benefits of recursion (in terms of computational speed) and the benefits of iteration (in terms of memory consumption). The enhanced recursion techniques described herein can be used in arbitrarily-dimensioned images, though are illustrated for computation of three-dimensional binary images. The terms volumetric image and voxel are used synonymously herein. While the enhanced recursion techniques are described with reference to three-dimensional images, these techniques are also applicable to n-dimensional images of arbitrary dimensions.

Object voxels are detected, and processed. All internal object voxels connected to a centre object voxel within a sub-image are marked with a current label, according to an enhanced recursion procedure. Non-internal object voxels, relative to the centre object voxel and its internal object voxels, initiate a subsequent enhanced recursion procedure.

For many types of typical computations, this approach is found to result in improvements in computational speed, and memory consumption. The number of object voxels involved in typical computations is usually much less than the number of background voxels, which are not involved in computations. Accordingly, iterative operations may not necessarily have an advantage in terms of computational speed, as iterative operations process the entire image, while recursive operations are performed only for object voxels.

Disclosed herein is a method of labeling components. The method includes the step of labeling with a current label all voxels that are internal to a predetermined sub-volume oriented with respect to an unlabeled voxel, and directly connected to the unmarked voxel. The labeling step is repeated for all voxels that are not internal to the predetermined sub-volume, but which are labeled with a current label. The method further includes increasing a window size to a predetermined maximum and incrementing the current label. The preceding steps are repeated for remaining unlabeled object voxels.

Also disclosed herein is a method for labeling connected components of a multi-dimensional binary volume. The method comprises the steps of scanning the multi-dimensional binary volume to identify unlabeled object voxels; and, for each unlabeled object voxel: formulating a sub-volume of the multi-dimensional binary volume relative to the respective unlabeled object voxel; labeling with a current label, each unlabeled object voxel internal to the sub-volume that is connected to the respective unlabeled object voxel; and selecting a different current label for the next unlabeled object voxel identified. The method comprises a combination of iterative and recursive processes.

The method may comprise the further step of initializing voxels of the multi-dimensional binary volume as either object voxels or background voxels and unlabeled object voxels external to one sub-volume and internal to another sub-volume may be labeled in a recursive process. If the binary volume is 3-dimensional, each unlabeled object voxel internal to the sub-volume that is 26-connected to the respective unlabeled object voxel is labeled with the current label. If the binary volume is 2-dimensional, each unlabeled object voxel internal to the sub-volume that is 8-connected to the respective unlabeled object voxel is labeled with the current label.

Computer systems and computer program products for performing the steps of the foregoing methods are also disclosed herein.

Advancements in desktop personal computing have reduced the cost of memory chips. Further, the Microsoft™ Visual C++6.0/7.0 development environment has a default stack allocation of 1 Megabyte (MB), though theoretically there is no limit on the stack size. The enhanced recursive method described herein offers a compromise between memory consumption and of computational time.

DESCRIPTION OF DRAWINGS

FIG. 2 is a table of pixel values illustrating an aspect of the component labeling technique described herein.

DETAILED DESCRIPTION

Figure 1:
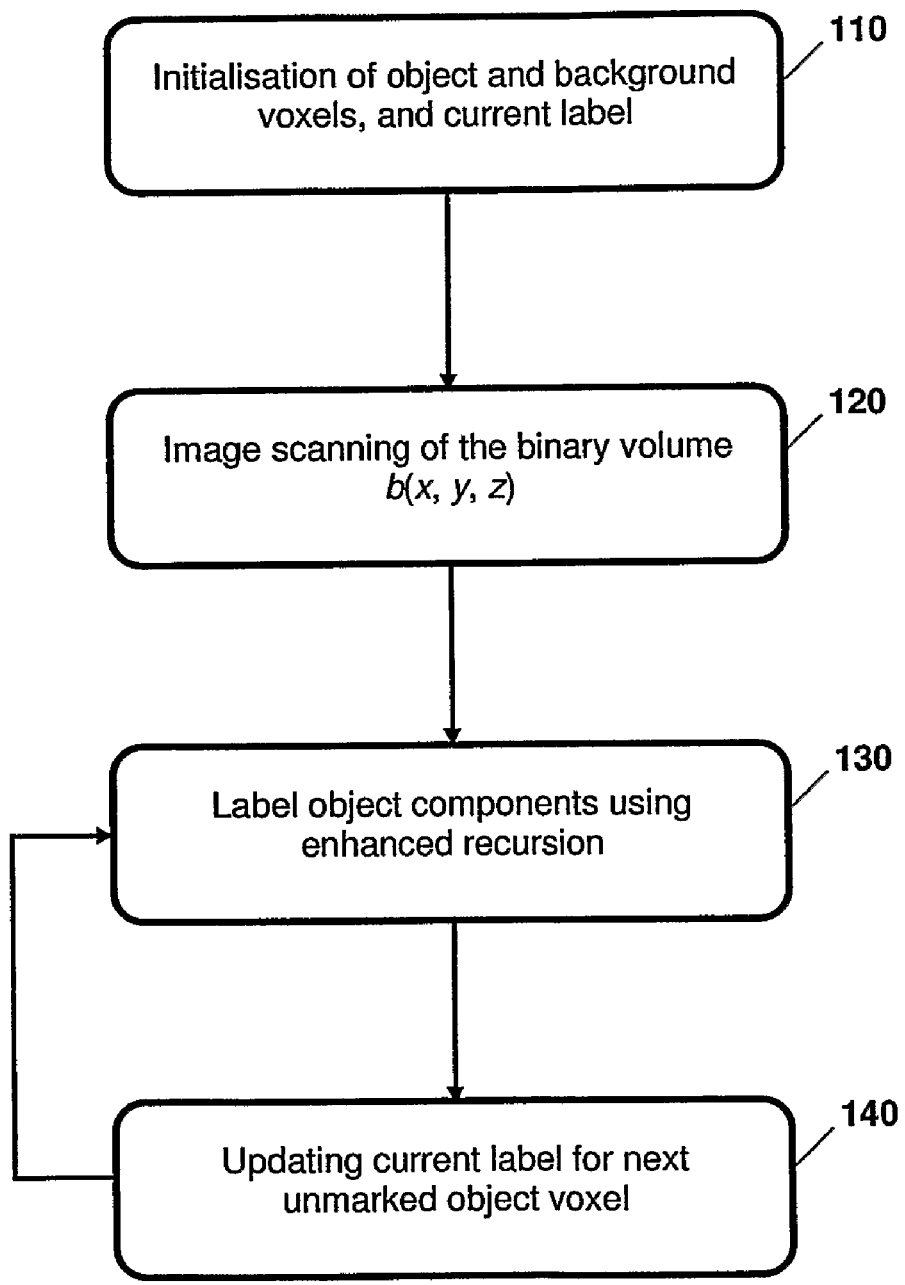
FIG. 1 is a flow chart of steps involved in a component labeling method described herein.

The term voxel is a contraction of "volumetric element", and is used to refer to the smallest distinguishable box-shaped part of a three-dimensional image. The label of a voxel (x, y, z) of a binary volume b(x, y, z) is interchangeably denoted as b(x, y, z).

Voxelization is the process of adding depth to an image using a set of cross-sectional images that are typically referred to as a volumetric dataset. These cross-sectional images (or slices) are represented pixels. The space between any two pixels in one slice is referred to as interpixel distance, which represents a "real-world" distance. The distance between any two slices is referred to as interslice distance, which also represents a "real-world" depth. The dataset is processed when slices are stacked in computer memory based on interpixel and interslice distances to accurately reflect the real-world sampled volume.

Next, additional slices are created and inserted between the dataset's actual slices so that the entire volume is represented as data. The pixels in each slice have, effectively, taken on volume and are now voxels. For a three-dimensional image, voxels undergo opacity transformation. Opacity transformation gives voxels different opacity values. This transformation is used to expose interior details of an image that would otherwise be hidden by darker, more opaque, outside-layer voxels. Voxel images are primarily used in the field of medicine and are applied to X-rays, CAT (Computed Axial Tomography) Scans, and MRIs (Magnetic Resonance Imaging) so one can obtain accurate 3D models of the human body. Voxels are object voxels when they correspond to objects that are of interest, otherwise they are background voxels. Note, a background voxel can also correspond to some tissue. Moreover, the definition of object voxel is application dependent. Consequently, a voxel that is an object voxel in one application may be categorized as a background voxel in another application.

An object component is a collection of object voxels that are connected (for example, 8-connected or 26-connected) with each other. Two voxels $(x_1, y_1, z_1)$ and $(x_2, y_2, z_2)$, if $|x_1-x_2|\leq 1$, $|y_1-y_2|\leq 1$, and $|z_1-z_2|\leq 1$, are called 26-neighbors and are 26-connected. For a three-dimensional volume, 26-connectedness for a voxel describes those voxels (26 in this case) directly surrounding a voxel. Geometrically, the 26-connected neighbors $(x_1, y_1, z_1)$ of a voxel having (x, y, z) as its integer coordinates satisfy the following: $|x-x_1|+|y-y_1|+|z-z_1|\leq 3$, $|x-x_1|\leq 1$, $|y-y_1|\leq 1$, $|z-z_1|\leq 1$, and $(x_1, y_1, z_1)\neq (x, y, z)$. Equivalent connectivity in two dimensions is 8 neighboring pixels, and the equivalent connectivity in an arbitrary dimension d is $(3^d-1)$ neighbors.

For a binary volume or sub-volume defined by $a\leq x\leq b$, $c\leq y\leq d$, $e\leq z\leq f$, any voxel (x, y, z) with a<x<b, c<y<d, and e<z<f is called an internal voxel, and is otherwise called a non-internal voxel. Voxels on the border of a volume are non-internal, and are internal voxels within this border. An internal object voxel is both an object voxel and an internal voxel, while a non-internal object voxel is both an object voxel and a non-internal voxel.

The enhanced recursion technique described herein reduces the number of recursive steps (thus decreasing memory consumption) while marking all the object voxels connected to a specified object voxel in a manner similar to that of the basic recursion. The enhanced recursion technique divides the entire volumetric element into sub-volumes, and labels internal object voxels in each sub-volume in a non-recursive way, to reduce memory consumption. Checking non-internal object voxels in each sub-volume ensures that the whole volume is checked and thus labeled.

FIG. 1 presents a flow chart of steps involved in labeling connected components. The technique yields a unique label for each of the object components of a binary image b(x, y, z). Each of the steps of FIG. 1 is described in turn below.

Step 110 Initialization of Object Voxels and Background Voxels

An initialization procedure is performed to standardize the labels of the object voxels and the background voxels to values of 1 and 0 respectively. The input is a binary image and these two values can, of course, be different from 1 and 0. For convenience, the labels of all object voxels are initialized to a value of 1, and the labels of all background voxels are initialized to a value of 0, in preparation of subsequent processing. All object voxels are thus labeled in preparation of subsequent steps.

Also, a current label m, which is used in subsequent steps, is initialized to an arbitrary value of 4. The current label m is assigned to the non-marked object voxels first encountered in the raster scanning order, described below in relation to Step 120.

Step 120 Determining Unmarked Object Voxels

The binary volume b(x, y, z) is scanned for unmarked (that is, unlabeled) object voxels, starting from voxel (0, 0, 0) in a predetermined raster scanning order. To accord with raster scanning convention, one may scan with x incremented first, followed by y and finally by z. A systemic scanning procedure avoids missing any unmarked object voxels. Other predetermined scanning procedures can be adopted if desired, provided that each object voxel is addressed in due course.

Step 130 Labeling Object Voxels

This step labels a connected component through enhanced recursion. Starting from the first unmarked object voxel (x0, y0, z0) found in step 2, all the unmarked object voxels 26-connected to (x, y, z) are marked with the same label m. This is achieved via the following sub-steps:

1) setting the working voxel w, which is w(x0, y0, z0);
2) formulating a $(2n_x+1)(2n_y+1)(2n_z+1)$ sub-volume of w, which is a copy of the original label volume b(x, y, z) around the voxel w;
3) labeling all internal object voxels 26-connected to its center voxel in the sub-volume with the current label m and changing the corresponding voxel in b(x, y, z) to m; and
4) for any voxel that is a non-internal object voxel 26-connected to w in the sub-volume, its coordinates are set to be the working voxel and go to 2).

(Sub-step 4 is a recursion, while sub-step 3 is an iteration, and the combination of sub-steps 3 and 4 is the enhanced recursion).

Suppose the numbers of voxels of the binary volume b(x, y, z) in x, y, and z directions are $L_x$, $L_y$, and $L_z$ respectively. Any voxel within b(x, y, z) will have its integer coordinate (x, y, z) satisfying $0 \leq x \leq (L_x-1)$, $0 \leq y \leq (L_y-1)$, and $0 \leq z \leq (L_z-1)$. When this is not satisfied, i.e., when either one of the following inequality is satisfied, the voxel (x, y, z) is said outside the volume b(x, y, z): $x<0$, $x>L_x$, $y<0$, $y>L_y$, $z<0$, or $z>L_z$.

The $(2n_x+1)(2n_y+1)(2n_z+1)$ neighborhood of a voxel (x', y', z') is a collection of all those voxels (x, y, z) satisfying $|x-x'| \leq n_x$, $|y-y'| \leq n_y$, $|z-z'| \leq n_z$, and (x, y, z)≠(x', y', z').

The derivation of a sub-volume (a cuboid with $(2n_x+1)(2n_y+1)(2n_z+1)$ voxels) from (x', y', z') is done this way: from (x', y', z') find its $(2n_x+1)(2n_y+1)(2n_z+1)$ neighborhood in b(x, y, z) and copy this neighborhood to the sub-volume; for those neighborhood voxels outside b(x, y, z), they are set to 0 in the formed sub-volume. The sub-volume has its own coordinate system, and the relationship between the original volume b(x, y, z) and the sub-volume is a translation: the center voxel of the sub-volume in its own coordinate system is $(n_x, n_y, n_z)$, which corresponds to (x', y', z') of the original volume b(x, y, z) in the original coordinate system. Through this translation the correspondence between the two volumes is complete built. This sub-volume is also called $(2n_x+1)(2n_y+1)(2n_z+1)$ sub-volume of (x', y', z') or $(2n_x+1)(2n_y+1)(2n_z+1)$ sub-volume from (x', y', z').

Labeling a connected component starting from the first met unmarked object voxel $(x_0, y_0, z_0)$ found in step 2 can be done in the following sub-steps.

Sub-step 1: set the coordinate of the working voxel was $(x_0, y_0, z_0)$;

Sub-step 2: formulate the sub-volume from the working voxel w;

Sub-step 3: in the sub-volume, label all internal object voxels 26-connected to its center voxel w with the current label m and change the corresponding voxel in b(x, y, z) to m;

Sub-step 4: for any voxel that is a non-internal object voxel 26-connected to w in the sub-volume, its coordinates are set to be the working voxel w and go to sub-step 2.

Sub-step 4 is a recursion, while sub-step 3 is an iteration, and the combination of sub-steps 3 and 4 is the enhanced recursion. Sub-step 3 needs further explanation as given below.

An iteration scheme is now described. Set an intermediate label m'=−10. Any negative number can be used, to avoid confusion with existing labeled object voxels.

Within a 3×3×3 neighborhood of (x, y, z), any object voxels are assigned the intermediate label m' (such as −10, as noted above) while voxel (x, y, z) is itself assigned label m. In this 3×3×3 neighborhood of (x, y, z), if any voxel $(x_1, y_1, z_1)$ has label m', check $(x_1, y_1, z_1)$'s 3×3×3 neighborhood. If any voxel $(x_2, y_2, z_2)$'s label is 1, also change $(x_2, y_2, z_2)$'s label to m'. Obviously $(x_2, y_2, z_2)$ is 26-connected to (x, y, z), by definition of being in the 3×3×3 neighborhood of (x, y, z). Change $(x_1, y_1, z_1)$'s label from m' to m, in any event.

Within a 5×5×5 neighborhood of (x, y, z), if any voxel $(x_3, y_3, z_3)$'s label is m', check the 3×3×3 neighborhood of $(x_3, y_3, z_3)$. If any voxel $(x_4, y_4, z_4)$'s label is 1, change its label to m'. Obviously $(x_4, y_4, z_4)$ is 26-connected to (x, y, z). As $(x_3, y_3, z_3)$ is 26-connected to (x, y, z) and $(x_4, y_4, z_4)$ is 26-connected to $(x_3, y_3, z_3)$, $(x_4, y_4, z_4)$ is also 26-connected to (x, y, z).

This increase in window sizes from 3× to 5×, and so on, continues until the window size reaches the predetermined maximum of $(2n_x+1) \times (2n_y+1) \times (2n_z+1)$. Consequently, all internal object voxels 26-connected to (x, y, z) within the sub-volume are labeled m while all non-internal object voxels 26-connected to (x, y, z) within the sub-volume are set back to label 1, and the enhanced recursions are initiated from them. This ensures that the internal object voxels 26-connected to (x, y, z) are labeled layer-by-layer, with voxels closer to (x, y, z) being labeled first, while maintaining the 26-connectivity. This procedure also ensures that the sub-volume does not block the recursion from reaching out to other parts of the image to be labeled by initiating the enhanced recursion from those non-internal object voxels that are 26-connected to (x, y, z).

Step 140 Updating Labels

This step prepares for labeling the next connected component, and finds the first unmarked object voxel in the raster scan order.

The step of updating includes incrementing the current label m (from an initial value of 4) by 1 so and incrementing x, followed by y and finally z to find the next unmarked (that is, a voxel with a label of "1") object voxel having a label of 1. Once an unmarked object voxel is found, the enhanced recursion of step 130 is initiated. The procedure stops when no further unmarked object voxels are found.

The output of the component labeling exercise is a unique label for each of the object voxels, with those voxels connected to each other having the same label, while those voxels that are non-connected have different labels.

Pseudocode

Table 1 below presents pseudo-code that represents the algorithm for component labeling described above.

TABLE 1

1. Set all object voxels to 1, and all background voxels to 0. Set the current label m to 4 (or any arbitrary integer greater than 2, as 2 is used to label boundary voxels).
2. a. Find the first unmarked object voxel $v_i$ in the raster scan order, and set a working voxel w as $v_i$;
   b. Formulate the $(2n_x + 1)(2n_y + 1)(2n_z + 1)$ sub-volume in b(x, y, z) centered around the working voxel w.
   c. Within the formulated sub-volume, change the label from 1 to m for all unlabeled object voxels that are 26-connected to the working voxel w.
   d. Change the corresponding voxels of b(x, y, z) in the $(2n_x + 1)(2n_y + 1)(2n_z + 1)$ neighborhood of w from 1 to m.
   e. For each non-internal object voxel with label m, set it as the working voxel w, return step 2b, until there is no unmarked object voxels 26-connected to $v_i$. The non-internal object voxels 26-connected to the center voxel in the sub-volume will be labeled when their respective coordinates are set as the working voxel to initiate subsequent recursion (go to sub-step 2 from sub-step 4).
   f. Increment m by 1 and return to step 2a to search for the next unmarked object voxel, until no unmarked object voxels remain.

Results

FIG. 2 illustrates one cycle of the enhanced recursion procedure for a 2D local window size 5×5, from an object pixel (1*). A two-dimensional window is shown for ease of representation. Internal object pixels 8-connected to the central pixel (1*) are marked 1#, and are assigned the same label as that of the 1* pixel, namely m. Non-internal object pixels 8-connected to the centre pixel within this local window are marked with 1** and are checked for subsequent round of enhanced recursion.

The first 4 object pixels in the first column are intact as they are not connected to the centre pixel (1*) in the 5×5 local window, even though they are eventually connected to the centre pixel.

Figure 3A:
FIGS. 3A and 3B: are representations of a sagittal slice of the interpolated phantom volume and the corresponding binary image with threshold 60.
Figure 3B:

FIGS. 3A and 3B are monochrome representations of a sagittal slice from an interpolated phantom with 9% noise and 40% inhomogeneity (FIG. 3A) and its binarized image with threshold 60 (FIG. 3B). Pixels with grayscale levels higher than the threshold value of 60 (and are hence lighter than the black background to a predetermined extent) are assigned as object voxels to be labeled, whereas pixels below this threshold are treated as background voxels, and are left unchanged. The maximum 3D connected object component is marked white, while other object components are marked gray, with a black background. FIG. 3B demonstrates that enhanced recursion can propagate to the whole image, so that connected components are labeled correctly.

Enhanced Method

Another method is described having enhancements compared with the above-described method. This enhanced method also yields a unique label for each of the 26-connected object components of 3D binary image b(x, y, z). The same broad steps represented in the flow chart of FIG. 1 apply. The boundary voxels are labeled in the same way, and non-boundary voxels are labeled with only one checking procedure: the same label as that of its left neighbor, that is, the same label as that of the voxel having the same y and z coordinates, but 1 less in x coordinate.

Step 110 Initialization

This includes setting all object voxels to 1 and background voxels 0; setting boundary voxels to 2 and the current label to a value of 4. A boundary voxel is an object voxel which is either non-internal to the image or within its 3×3×3 neighborhood there is at least one background voxel.

Step 120 Scanning

Scan the binary volume b(x, y, z) starting from voxel (0, 0, 0) with x incremented first, followed by y and finally by z.

Step 130 Labeling

Label object voxels as these voxels are encountered in the scanned order.

When b(x, y, z)=2 and x=0, or b(x, y, z)=2 and x≧1 and b(x−1, y, z)=0, find the boundary component from (x, y, z) using the enhanced recursion described in Step 130 of the $M_1$ method, and assign this boundary component with the current label m, and the current label m is incremented by 1.

When b(x, y, z)=2, x≧1, and b(x−1, y, z)>0, find the boundary component from (x, y, z) using the enhanced recursion described in Step 130 of $M_1$ and assign this boundary component with label b(x−1, y, z). The voxel at (x−1, y, z) is an object voxel, and is labeled as b(x−1, y, z). As the voxel at (x, y, z) is an object voxel and is obviously 26-connected to (x−1, y, z), the label at (x, y, z) should be the same as that at (x−1, y, z), which is b(x−1, y, z). When b(x, y, z)=1, (x, y, z) is an internal object voxel, and b(x, y, z) is assigned the label of its left voxel b(x−1, y, z).

Step 140 Updating

This includes incrementing x, followed by y and finally z to find the next unmarked object voxel with label 1 or 2 and initiate Step 130. This cycle is continued until no unmarked object voxels remain.

Computer Hardware

Figure 4:
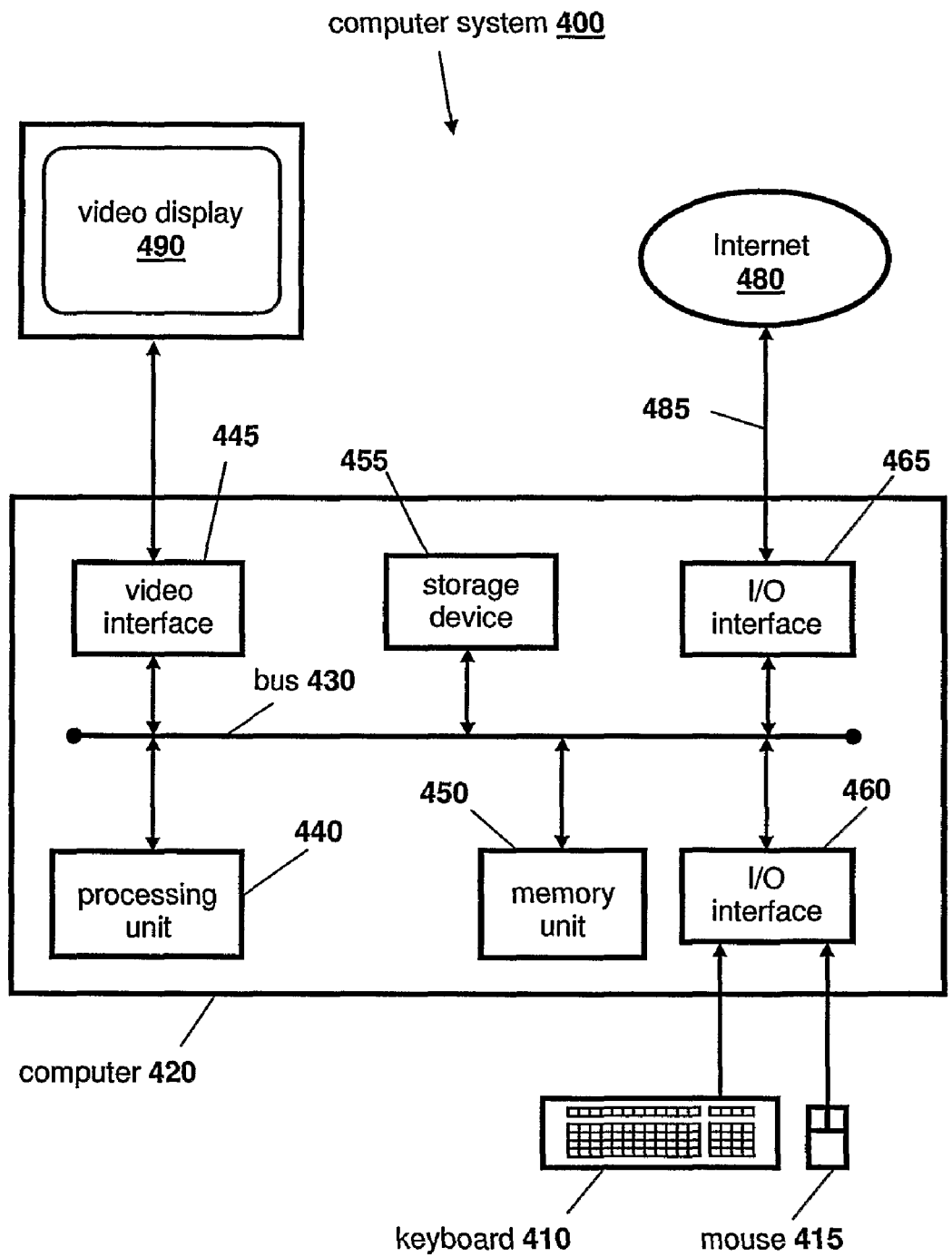
FIG. 4 is a schematic representation of a computer system suitable for performing a component labeling method described herein.

FIG. 4 is a schematic representation of a computer system 400 of a type that is suitable for executing computer software for component labeling, as described hereinbefore. Computer software executes under a suitable operating system installed on the computer system 400, and may be thought of as comprising various software code means for achieving particular steps.

The components of the computer system 400 include a computer 420, a keyboard 410 and mouse 415, and a video display 490. The computer 420 includes a processing unit 440, a memory unit 450, input/output (I/O) interfaces 460, 465, a video interface 445, and a storage device 455.

The processing unit 440 comprises one or more central processing units (CPU) that executes the operating system and the computer software executing under the operating system. The memory unit 450 may comprise random access memory (RAM) and/or read-only memory (ROM), and is used under direction of the processing unit 440.

The video interface 445 is connected to video display 490 and provides video signals for display on the video display 490. User input to operate the computer 420 is provided from the keyboard 410 and mouse 415. The storage device 455 can include a disk drive or any other suitable storage medium.

Each of the components of the computer 420 is connected to an internal bus 430 that includes data, address, and control buses, to allow components of the computer 420 to communicate with each other via the bus 430.

The computer system 400 can be connected to one or more other similar computers via an input/output (I/O) interface 465 using a communication channel 485 to a network, represented as the Internet 480.

The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420.

Other configurations or types of computer systems can be equally well used to execute computer software that assists in implementing the techniques described herein.

Conclusion

The foregoing description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless stated to the contrary.

The term "comprising" (and its grammatical variations such as "comprises" and "comprised of") as used herein are used in the inclusive sense of "having" or "including" and not in the exclusive sense of "consisting only of".

The invention claimed is:

1. A computer-implemented method of labeling components comprising the steps of:
   labeling with a current label all object voxels that are internal to a predetermined sub-volume oriented with respect to an unlabeled object voxel, and directly connected to the unlabeled object voxel;
   repeating the labeling step for all object voxels that are not internal to the predetermined sub-volume, but which are labeled with a current label;
   increasing a window size to a predetermined maximum;
   incrementing the current label; and
   repeating the preceding steps for remaining unlabeled object voxels;
   wherein said labeling step comprises a combination of iterative and recursive processes.

2. The computer-implemented method as claimed in claim 1, further comprising the step of initializing voxels of a volume as either object voxels or background voxels.

3. A computer program product for labeling components comprising computer software recorded on a non-transitory computer-readable medium, said computer software comprising:
- computer program code for labeling with a current label all object voxels that are internal to a predetermined sub-volume oriented with respect to an unlabeled object voxel, and directly connected to the unlabeled object voxel;
- computer program code for repeating the labeling step for all object voxels that are not internal to the predetermined sub-volume, but which are labeled with a current label;
- computer program code for increasing a window size to a predetermined maximum;
- computer program code for incrementing the current label; and
- computer program code for repeating the preceding steps for remaining unlabeled object voxels;
- wherein said computer program code for labeling comprises a combination of iterative and recursive processes.

4. A computer system for labeling components, said computer system comprising:
- a memory unit for storing data and instructions to be performed by a processing unit, said processing unit coupled to said memory unit and programmed to:
- label with a current label, using a combination of iterative and recursive processes, all object voxels that are internal to a predetermined sub-volume oriented with respect to an unlabeled object voxel, and directly connected to the unlabeled object voxel;
- repeat the labeling step for all object voxels that are not internal to the predetermined sub-volume, but which are labeled with a current label;
- increase a window size to a predetermined maximum;
- increment the current label; and
- repeat the preceding steps for remaining unlabeled object voxels.

5. A computer-implemented method for labeling connected components of a multi-dimensional binary volume, said method comprising the steps of:
- scanning said multi-dimensional binary volume to identify unlabeled object voxels;
- for each unlabeled object voxel:
  - formulating a sub-volume of said multi-dimensional binary volume relative to the respective unlabeled object voxel;
  - labeling with a current label, each unlabeled object voxel internal to said sub-volume that is connected to said respective unlabeled object voxel; and
  - selecting a different current label for the next unlabeled object voxel identified;
- wherein said labeling step comprises a combination of iterative and recursive processes.

6. The computer-implemented method as claimed in claim 5, wherein unlabeled object voxels external to one sub-volume and internal to another sub-volume are labeled in a recursive process.

7. The computer-implemented method as claimed in claim 5, comprising the further step of initializing voxels of said multi-dimensional binary volume as either object voxels or background voxels.

8. The computer-implemented method as claimed in claim 5, wherein said binary volume is 3-dimensional and each unlabeled object voxel internal to said sub-volume that is 26-connected to said respective unlabeled object voxel is labeled with said current label.

9. The computer-implemented method as claimed in claim 5, wherein said binary volume is 2-dimensional and each unlabeled object voxel internal to said sub-volume that is 8-connected to said respective unlabeled object voxel is labeled with said current label.

10. A computer system for labeling connected components of a multi-dimensional binary volume, said computer system comprising:
- a memory unit for storing data and instructions to be performed by a processing unit; and
- a processing unit coupled to said memory unit, said processing unit programmed to:
- scan said multi-dimensional binary volume to identify unlabeled object voxels; and
- for each unlabeled object voxel:
  - formulate a sub-volume of said multi-dimensional binary volume relative to the respective unlabeled object voxel;
  - label with a current label, each unlabeled object voxel internal to said sub-volume that is connected to said respective unlabeled object voxel; and
  - select a different current label for the next unlabeled object voxel identified;
- wherein said processing unit is programmed to perform said labeling using a combination of iterative and recursive processes.

11. The computer system as claimed in claim 10, wherein said processing unit is programmed to label object voxels external to one sub-volume and internal to another sub-volume in a recursive process.

12. The computer system as claimed in claim 10, wherein said processing unit is programmed to initialize voxels of said multi-dimensional binary volume as either object voxels or background voxels.

13. The computer system as claimed in claim 10, wherein said binary volume is 3-dimensional and said processing unit is programmed to label each unlabeled object voxel internal to said sub-volume that is 26-connected to said respective unlabeled object voxel with said current label.

14. The computer system as claimed in claim 10, wherein said binary volume is 2-dimensional said processing unit is programmed to label each unlabeled object voxel internal to said sub-volume that is 8-connected to said respective unlabeled object voxel with said current label.

15. A non-transitory computer program product comprising a computer readable medium comprising a computer program recorded therein for labeling connected components of a multi-dimensional binary volume, said computer program product comprising:
- computer program code for scanning said multi-dimensional binary volume to identify unlabeled object voxels; and
- computer program code for each unlabeled object voxel:
  - formulating a sub-volume of said multi-dimensional binary volume relative to the respective unlabeled object voxel;
  - labeling with a current label, each unlabeled object voxel internal to said sub-volume that is connected to said respective unlabeled object voxel; and
  - selecting a different current label for the next unlabeled object voxel identified;
- wherein said computer program code for labeling comprises computer program code for performing a combination of iterative and recursive processes.

16. The computer program product as claimed in claim 15, wherein unlabeled object voxels external to one sub-volume and internal to another sub-volume are labeled in a recursive process.

17. The computer program product as claimed in claim 15, further comprising computer program code for initializing voxels of said multi-dimensional binary volume as either object voxels or background voxels.

18. The computer program product as claimed in claim 15, wherein said binary volume is 3-dimensional and said computer program product further comprises computer program code for labeling each unlabeled object voxel internal to said sub-volume that is 26-connected to said respective unlabeled object voxel with said current label.

19. The computer program product as claimed in claim 15, wherein said binary volume is 2-dimensional and said computer program product further comprises computer program code for labeling each unlabeled object voxel internal to said sub-volume that is 8-connected to said respective unlabeled object voxel with said current label.

* * * * *